(12) United States Patent
Seki et al.

(10) Patent No.: US 11,440,375 B2
(45) Date of Patent: Sep. 13, 2022

(54) RADIANT HEATER DEVICE

(71) Applicant: DENSO CORPORATION, Kariya (JP)

(72) Inventors: Hideki Seki, Kariya (JP); Kimitake Ishikawa, Kariya (JP); Hiroyasu Oide, Kariya (JP); Yusuke Tanaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 623 days.

(21) Appl. No.: 16/396,833

(22) Filed: Apr. 29, 2019

(65) Prior Publication Data

US 2019/0248211 A1    Aug. 15, 2019

Related U.S. Application Data

(63) Continuation of application No. PCT/JP2017/036355, filed on Oct. 5, 2017.

(30) Foreign Application Priority Data

Nov. 16, 2016 (JP) .............................. JP2016-223467

(51) Int. Cl.
*B60H 1/22* (2006.01)
*B60H 1/00* (2006.01)
*H05B 3/26* (2006.01)
*F24D 5/08* (2006.01)
*H05B 3/34* (2006.01)
(Continued)

(52) U.S. Cl.
CPC ............. *B60H 1/2227* (2019.05); *B60H 1/22* (2013.01); *B60H 1/2226* (2019.05); *F24D 5/08* (2013.01); *H05B 3/10* (2013.01); *H05B 3/20* (2013.01); *H05B 3/26* (2013.01); *H05B 3/267* (2013.01); *H05B 3/342* (2013.01); *H05B 3/36* (2013.01)

(58) Field of Classification Search
None
See application file for complete search history.

(56) References Cited

U.S. PATENT DOCUMENTS

2002/0157429 A1    10/2002  Matsumoto
2003/0106346 A1     6/2003  Matsumoto
(Continued)

FOREIGN PATENT DOCUMENTS

JP      S59187089 U    12/1984
JP      S64010033 A     1/1989
(Continued)

OTHER PUBLICATIONS

JP 2008-265716 A, Matsushita Electric, Nov. 2008, "Vehicle Heater," partial translation. (Year: 2008).*

*Primary Examiner* — Joseph M. Pelham
(74) *Attorney, Agent, or Firm* — Harness, Dickey & Pierce, P.L.C.

(57) ABSTRACT

A radiant heater device for generating a radiant heat, includes a substrate portion having a plate shape and made of an electrically insulating material, a surface member having a sheet shape and disposed on one surface side of the substrate portion, and a heat generation portion formed on the other surface side of the substrate portion. The surface member is formed of a fiber fabric that is provided with a space portion recessed toward the substrate portion in a thickness direction of the surface member and that restricts a heat transfer in a surface direction of the surface member by the space portion.

7 Claims, 5 Drawing Sheets

(51) Int. Cl.
*H05B 3/36* (2006.01)
*H05B 3/20* (2006.01)
*H05B 3/10* (2006.01)

(56) References Cited

U.S. PATENT DOCUMENTS

| | | | |
|---|---|---|---|
| 2006/0151455 A1* | 7/2006 | Stowe | B60H 1/2227 219/202 |
| 2010/0176110 A1* | 7/2010 | Ogino | B60H 1/2226 219/202 |
| 2012/0168420 A1* | 7/2012 | Ogino | B60H 1/00285 219/217 |
| 2015/0110477 A1* | 4/2015 | Ota | B60H 1/2227 392/435 |
| 2015/0122799 A1 | 5/2015 | Taniguchi et al. | |
| 2016/0059669 A1 | 3/2016 | Sagou et al. | |
| 2016/0059670 A1* | 3/2016 | Satzger | H05B 3/22 219/202 |
| 2016/0144690 A1* | 5/2016 | Wittkowski | B60H 1/2215 219/202 |
| 2016/0167482 A1 | 6/2016 | Oh et al. | |
| 2017/0129310 A1* | 5/2017 | Sagou | F24H 3/002 |
| 2018/0194199 A1* | 7/2018 | Oh | B60H 1/2215 |
| 2018/0208021 A1* | 7/2018 | Seki | B60H 1/2215 |
| 2018/0257456 A1* | 9/2018 | Oh | B60H 1/2215 |
| 2019/0023103 A1* | 1/2019 | Tanaka | F24D 19/02 |

FOREIGN PATENT DOCUMENTS

| | | | | |
|---|---|---|---|---|
| JP | H07216711 A | 8/1995 | | |
| JP | H08205968 A | 8/1996 | | |
| JP | 2008265716 A | 11/2008 | | |
| JP | 2010052710 A | * 3/2010 | | B60H 1/2227 |
| JP | 2010091185 A | 4/2010 | | |
| JP | 2012006411 A | 1/2012 | | |
| JP | 2013251184 A | 12/2013 | | |
| JP | 2014-205372 A | 10/2014 | | |
| JP | 2014189251 A | 10/2014 | | |
| JP | 2016113137 A | 6/2016 | | |
| WO | WO-01/044551 A1 | 6/2001 | | |
| WO | WO-2013179836 A1 | 12/2013 | | |

* cited by examiner

RADIANT HEATER DEVICE

CROSS REFERENCE TO RELATED APPLICATIONS

The present application is a continuation application of International Patent Application No. PCT/JP2017/036355 filed on Oct. 5, 2017, which designated the United States and claims the benefit of priority from Japanese Patent Application No. 2016-223467 filed on Nov. 16, 2016. The entire disclosures of all of the above applications are incorporated herein by reference.

TECHNICAL FIELD

The present disclosure relates to a radiant heater device.

BACKGROUND

Conventionally, there is a radiant heater device for generating a radiant heat.

SUMMARY

The present disclosure provides a radiant heater device that includes a substrate portion having a plate shape and made of an electrically insulating material, a surface member having a sheet shape and disposed on one surface side of the substrate portion, and a heat generation portion formed on the other surface side of the substrate portion. The surface member is formed of a fiber fabric that is provided with a space portion recessed toward the substrate portion in a thickness direction of the surface member and that restricts a heat transfer in a surface direction of the surface member by the space portion.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
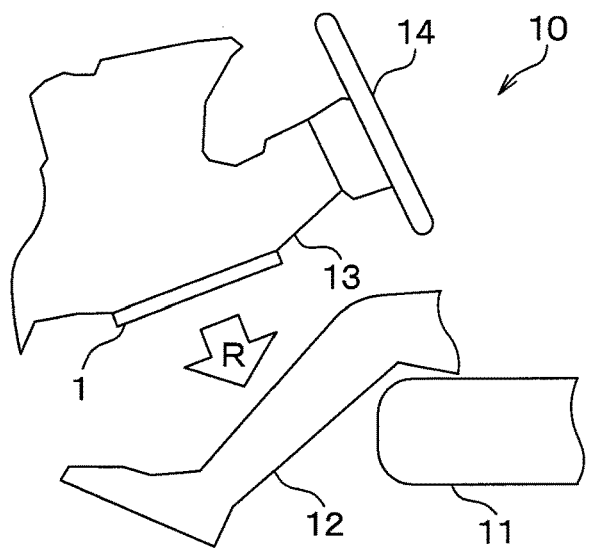
FIG. 1 is a diagram showing a state in which a radiant heater device according to a first embodiment is attached to a vehicle.

Before describing embodiments of the present disclosure, a radiant heater device according to a comparative example will be described below. The radiant heater device according to the comparative example includes a substrate portion providing a surface made of an electrically insulating material, and multiple heat generation portions disposed in parallel to each other so as to extend along the surface of the substrate portion. In the radiant heater device, a temperature of the heat generation portion rises in response to energization, and when an object comes into contact with the heat generation portion, the temperature of the heat radiation portion falls. The radiant heater device further includes a surface layer on the surface of the substrate portion, and the surface layer is configured by a sheet made of a thermoplastic resin and having a plurality of protrusion portions. Thus, a contact area between an object and the surface layer is small, and a direct heat transfer from the heater device to the object is restricted.

Since the radiant heater device according to the comparative example is formed with the surface layer made of a sheet of resin, it has been found by studies of the present inventors that it is insufficient to quickly lower a temperature of a contact portion when the object comes into contact with the contact portion.

According to one aspect of the present disclosure, a radiant heater device for generating a radiant heat, includes a substrate portion having a plate shape and made of an electrically insulating material, a surface member having a sheet shape and disposed on one surface side of the substrate portion, and a heat generation portion formed on the other surface side of the substrate portion. The surface member is formed of a fiber fabric that is provided with a space portion recessed toward the substrate portion in a thickness direction of the surface member and that restricts a heat transfer in a surface direction of the surface member by the space portion.

According to such a configuration, since the surface member is formed of the fiber fabric that is provided with the space portion recessed toward the substrate portion in the thickness direction of the surface member and a heat transfer in the surface direction of the surface member is restricted by the space portion, the temperature of the contact portion when the object comes into contact with the surface member can be lowered more quickly.

Hereinafter, a plurality of embodiments will be described with reference to the drawings. In each of the embodiments, the same reference numerals are assigned to portions corresponding to the items described in the preceding embodiments, and a repetitive description thereof may be omitted. When only a part of the configuration is described in each form, the other forms described above can be applied to the other parts of the configuration.

First Embodiment

A radiant heater device 1 according to a first embodiment of the present disclosure will be described with reference to FIGS. 1 to 10. In FIG. 1, the radiant heater device 1 according to the first embodiment is installed in an interior of a moving object such as a road traveling vehicle, a ship, or an aircraft. The radiant heater device 1 configures a part of a heating device 10 for the interior. The radiant heater device 1 is an electric heater that is supplied with a power from a power supply such as a battery or a generator mounted on the moving object to generate a heat. The radiant heater device 1 is in the form of a thin plate-shape. The radiant heater device 1 generates the heat when supplied with power. The radiant heater device 1 radiates a radiant heat R primarily in a direction perpendicular to a surface of the radiant heater device 1 in order to warm a target object positioned in the direction perpendicular to the surface.

A seat 11 on which an occupant 12 is seated is installed in the interior. The radiant heater device 1 is installed in the interior so as to radiate the radiant heat R to feet of the occupant 12. The radiant heater device 1 can be used as a device for providing immediate warmth to the occupant 12 immediately after activation of the heating device 10. The radiant heater device 1 is installed on a wall surface of an interior. The radiant heater device 1 is installed so as to face the occupant 12 who is in an assumed normal posture. For example, the road traveling vehicle has a steering column 13 for supporting a steering wheel 14. The radiant heater device 1 can be installed on a lower surface of the steering column 13. The radiant heater device 1 is installed so that a surface of the radiant heater device 1 is exposed to the interior.

Figure 2:
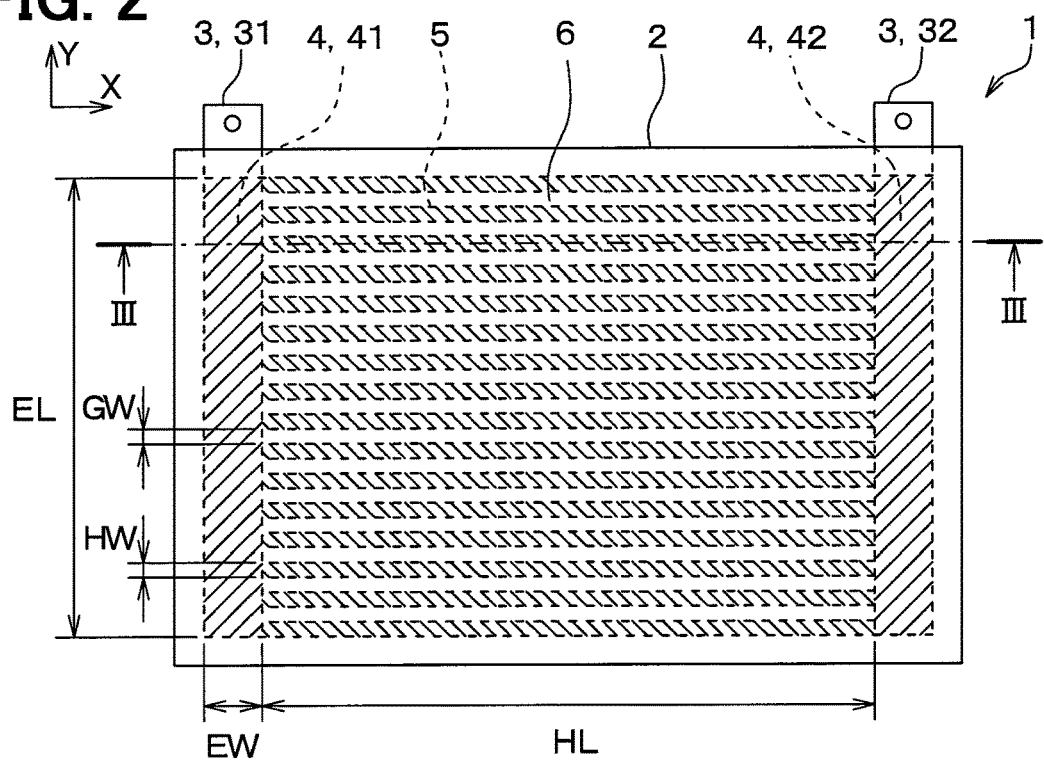
FIG. 2 is a plan view of the radiant heater device according to the first embodiment.

In FIG. 2, the radiant heater device 1 extends along an X-Y plane defined by an axis X and an axis Y. The radiant heater device 1 is formed in a thin plate-shape having a substantially rectangular shape. The radiant heater device 1 includes a substrate portion 2, multiple electrodes 3 and 4, and multiple heat generation portions 5. In the drawing, the electrodes 4 and the heat generation portions 5 embedded in the substrate portion 2 are hatched.

Figure 3:
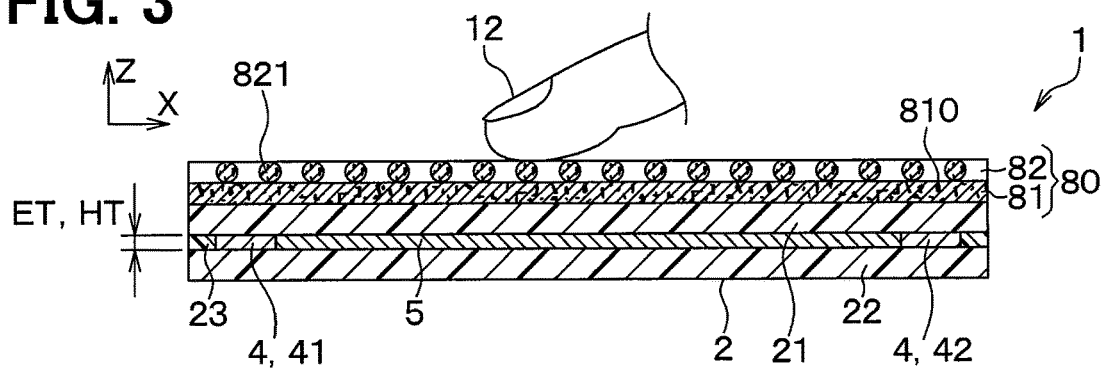
FIG. 3 is a cross-sectional view taken along a line III-III in FIG. 2.

FIG. 3 shows a III-III cross section of FIG. 2. In the figure, the radiant heater device 1 has a thickness in a direction of the axis Z. The radiant heater device 1 may also be referred to as a planar heater, which radiates the radiant heat R primarily in a direction perpendicular to the surface.

The substrate portion 2 is made of a resin material which provides an excellent electrical insulation property and withstands a high temperature. The substrate portion 2 is formed in a plate-like shape. The substrate portion 2 is a multilayer substrate.

The substrate portion 2 has a front surface layer 21 and a back surface layer 22. Those layers 21 and 22 are provided by sheets of thermoplastic resin.

A surface member 80, which will be described later, is bonded to the front surface layer 21. A side of the front surface layer 21 to which the surface member 80 is bonded corresponds to one surface side of the substrate portion 2. The surface member 80 is exposed toward the interior. The surface member 80 provides a front surface of the radiant heater device 1. The back surface layer 22 provides a back surface of the radiant heater device 1. An intermediate layer 23 is disposed between the front surface layer 21 and the back surface layer 22. Materials forming the electrodes 3 and 4 and the heat generation portions 5 is supported on one or more of the layers 21, 22, and 23, A side of one or more of the layers 21, 22, and 23 on which the heat generation portions 5 are supported corresponds to the other surface side of the substrate portion 2. The substrate portion 2 is a member for supporting the electrodes 3 and 4 and the heat generation portions 5.

The material of the substrate portion 2 provides a thermal conductivity which is sufficiently lower than that of the electrodes 3 and 4 and the heat generation portions 5. The substrate portion 2 provides a heat insulating portion for reducing a heat conduction between two adjacent heat generation portions 5.

The multiple electrodes 3 and 4 include the external electrodes 3 at least partially exposed to the outside of the radiant heater device 1 and the internal electrodes 4 disposed in the substrate portion 2. The electrodes 3 each include a pair of electrodes 31 and 32 for supplying an electric power. The pair of electrodes 31 and 32 provide terminals of the radiant heater device 1. The electrodes 3 are disposed on an outer surface of the substrate portion 2 including an outer edge portion, the front surface, and the back surface of the substrate portion 2. A part of the electrodes 3 is embedded in the substrate portion 2 and electrically connected to the electrodes 4. The electrodes 4 may be exposed on an outer surface of the substrate portion 2 and used as terminals for supplying the electrodes.

The electrodes 4 are embedded in the substrate portion 2. The electrodes 4 are also busbar portions for distributing the electric power to the multiple heat generation portions 5 to be described later. The electrodes 4 extend from the electrodes 3. The electrodes 4 have an electrical resistance value sufficiently lower than that of the multiple heat generation portions 5. The electric resistance value of the electrodes 4 is set so as to be able to reduce a heat generation in the electrodes 4. The electrodes 4 evenly distribute a current to the multiple heat generation portions 5. The electrodes 4 have a pair of electrodes 41 and 42 for supplying the electric power. The pair of electrodes 41 and 42 are disposed apart from each other at both ends of a unit region of the substrate portion 2. The pair of electrodes 41 and 42 extend along both sides of the unit region of the substrate portion 2. Regions where the pair of electrodes 41 and 42 are provided and a region between those regions define a unit region.

Each of the multiple heat generation portions 5 is embedded in the substrate portion 2. The heat generation portions 5 are disposed between the front surface layer 21 and the back surface layer 22. Therefore, the heat generation portions 5 are not exposed to the surface of the substrate portion 2. The heat generation portions 5 are protected by the substrate portion 2. The heat generation portions 5 are disposed between the pair of electrodes 41 and 42. The heat generation portions 5 extend linearly between the pair of electrodes 41 and 42. The heat generation portions 5 can be referred to as linear heat generation elements. The heat generation portions 5 extend straight between the pair of electrodes 41 and 42 in a straight line. One end of the heat generation portions 5 is electrically and mechanically connected to one electrode 41. The other end of the heat generation portions 5 is electrically and mechanically connected to the other electrode 42.

The heat generation portions 5 are each formed in a thin plate-shape parallel to the surface of the substrate portion 2. The heat generation portions 5 are capable of radiating the radiant heat R by a heat supplied by energization. The heat generation portions 5 can radiate the radiant heat R that causes the occupant 12, that is, a person to feel warmth by being heated to a predetermined radiation temperature Tr.

The volume of the heat generation portions 5 is set so as to reach a temperature at which the heat generation portions 5 can radiate the radiant heat R by the heat supplied from the heat generation portions 5. The volume of the heat generation portions 5 is set so that the temperature of the electrodes 3 rises rapidly by the heat supplied from the heat generation portions 5. The volume of the heat generation portions 5 is set small so as to cause a rapid temperature drop by radiating the heat to an object coming in contact with the surface of the radiant heater device 1. A thickness of the heat generation portions 5 is set to be thin in order to maximize an area parallel to the surface and minimize the volume. An area of the heat generation portions 5 is set to a width suitable for radiating the radiant heat R. The area of the heat generation portions 5 is set to be smaller than that of the object, for example, a part of the occupant 12, which is positioned facing the surface of the radiant heater device 1.

The multiple heat generation portions 5 are disposed in parallel with each other. The multiple heat generation portions 5 are electrically connected in parallel to each other between the pair of electrodes 41 and 42. The multiple heat generation portions 5 are disposed so as to define gaps 6 between the heat generation portions 5.

The multiple heat generation portions 5 are disposed so as to be substantially uniformly dispersed on the surface of the substrate portion 2. The multiple heat generation portions 5 are disposed so as to be distributed with a substantially uniform density in a region between the pair of electrodes 41 and 42. The multiple heat generation portions 5 are disposed in a distributed manner in most areas of the unit region of the substrate portion 2.

The shapes and dimensions defining cross-sectional areas of the electrodes 3 and 4 in an energization direction, as well as the materials of the electrodes 3 and 4 are selected and set to provide a low electrical resistance value. The cross-sectional areas and materials of the electrodes 3 and 4 are set so as to provide an excellent electrical conductor in order to distribute the current evenly to the multiple heat generation portions 5. The shape and dimensions defining a cross-sectional area of the heat generation portions 5 along the energization direction, and the material of the heat generation portions 5 are selected and set to provide a high electrical resistance value so as to generate the radiant heat R by energization. The material of the electrodes 3 and 4 and the material of the heat generation portions 5 are different from each other. The resistivity of the material of the electrodes 3 and 4 is sufficiently lower than the electrical resistivity of the material of the heat generation portions 5.

The electrodes 4 are elongated and have a longitudinal direction along the axis Y. The electrodes 4 have a length EL along the axis Y. The length EL corresponds to an energization direction in the electrodes 4. The electrodes 4 have a width EW along the axis X. The width EW is orthogonal to the energization direction. The electrodes 4 have a thickness ET along the axis Z. The thickness ET is less than the length EL and the width EW. Thus, the electrodes 4 provide a ribbon-shaped electrical conductor.

The heat generation portions 5 are elongated and have a longitudinal direction along the axis X. The heat generation portions 5 have a length HL along the axis X. The length HL corresponds to the energization direction in the heat generation portions 5. The heat generation portions 5 have a width HW along the axis Y. The width HW is orthogonal to the energization direction. The heat generation portions 5 have a thickness HT along the axis Z. The thickness HT is less than the length HL and the width HW. Thus, the heat generation portions 5 provide a ribbon-shaped heat generation element.

The thickness HT is desirably set to be smaller than the width HW (that is, HW>HT). The thickness HT is desirably set to be smaller than 1 mm. The thickness HT is desirably set to be smaller than 100 μm.

The width EW is set to be larger than the width HW in order to reduce the electric resistance value in the electrodes 4. In the present embodiment, a cross-sectional area of the electrodes 4 orthogonal to the conduction direction is larger than the cross-sectional area of the heat generation portions 5 orthogonal to the energization direction. The resistivity of the electrodes 4, which is smaller than the resistivity of the heat generation portions 5, makes it possible to reduce the cross-sectional area of the electrodes 4. For the same purposes, the thickness ET may be set to be larger than the thickness HT.

The gaps 6 have a width GW. A length of the gaps 6 is the same as the length HL of the heat generation portions 5. The multiple heat generation portions 5 and the multiple gaps 6 are alternately disposed over the overall length EL of the electrodes 4. The width GW of the gaps 6 can be set to be equal to the width HW of the heat generation portions 5. As a result, the multiple heat generation portions 5 are uniformly dispersed and disposed. In addition, the heat generation portions 5 and the gaps 6 having the fine widths HW and GW, respectively, are disposed at high density. As a result, a temperature distribution on the surface of the radiant heater device 1 is restricted. Such a high-density arrangement of the fine heat generation portions 5 contributes to radiating the uniform radiant heat R from the surface of the radiant heater device 1.

According to the present embodiment, the radiant heater device 1 is formed in a thin plate-shape. Further, the electrodes 3 and 4 and the heat generation portions 5 buried inside the substrate portion 2 are in a film shape extending in parallel with the surface of the substrate portion 2. The film-shaped electrodes 3 and 4 and the film-shaped heat generation portions 5 are advantageous for radiating the radiant heat R over a large area.

The heat generation portions 5 are made of a material that generates the heat by energization. The heat generation portions 5 exhibit an electrical resistance value along the energization direction so as to generate the heat by energization. The heat generation portions 5 can be made of a metallic material. The heat generation portions 5 can be made of a tin alloy. The heat generation portions 5 can be made of an alloy containing copper, silver, and tin. The heat generation portions 5 can also be made of a heating wire material such as a stainless steel alloy, a nickel-chromium alloy, or an aluminum alloy.

The electrodes 3 and 4 are made of a material having an electrical resistivity lower than that of the material of the heat generation portions 5. The electrodes 3 and 4 are made of a material that generates less heat than the heat generation portions 5 when energized. The electrodes 3 and 4 are made of a material having a low resistivity so that a current can be evenly distributed to the multiple heat generation portions 5. The electrodes 3 and 4 can be made of a metallic material. The electrodes 3 and 4 can be made of a tin alloy. The electrodes 3 and 4 can be made of an alloy containing copper, silver or tin. The electrodes 3 and 4 can also be made of an excellent conductor material such as a copper alloy or an aluminum alloy.

When a predetermined voltage, for example, 12 V DC power is supplied to the electrodes 31 and 32, the multiple heat generation portions 5 generate the heat by a current flowing through the multiple heat generation portions 5. The radiant heat R is provided from the surface of the radiant heater device 1 by the multiple heat generation portions 5 generating the heat. The temperature of the multiple heat generation portions 5 rises earlier than the temperature rise of the air in the interior by the heating device. As a result, warmth can be imparted to the occupant 12 by the radiant heat R earlier than the heating effect by the heating device.

The volumes of the electrodes 4 and the heat generation portions 5 are set so as to reduce the heat capacity. The heat capacity of the heat generation portions 5 is set so that when an object comes into contact with the surface of the radiant heater device 1, the surface temperature of the radiant heater device 1 at the contact portion falls below a predetermined temperature in a short time. In a desirable mode, the heat capacity of the heat generation portions 5 is set so that the surface temperature of the contact portion is lower than 60° C. when a human finger comes into contact with the surface of the radiant heater device 1.

As described above, the multiple heat generation portions 5 are disposed in parallel with each other inside the substrate portion 2 having a lower thermal conductivity than that of the heat generation portions 5. Thus, the high heat conduction portions and the low heat conduction portions are alternately disposed inside the substrate portion 2. As described above, the heat generation portions 5 according to the present embodiment has a structure in which the heat transfer in the surface direction of the substrate portion 2 is restricted.

The radiant heater device 1 according to the present embodiment further restricts the heat transfer in the surface direction of the surface member 80 by the surface member 80 provided on the front surface layer 21 of the substrate portion 2.

The surface member 80 is made of fiber fabrics 81 and 82. In the fiber fabrics 81 and 82, the space portion 80a recessed toward the substrate portion 2 side in the thickness direction of the surface member 80 is provided, and the space portion 80a restricts the heat transfer in the surface direction of the surface member 80.

Figure 4A:
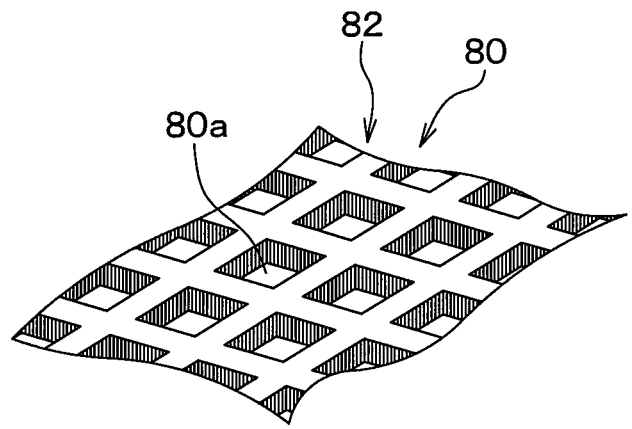
FIG. 4A is an external view of a knitted fabric according to the first embodiment.

The fiber fabrics 81 and 82 according to the present embodiment are configured of knitted fabrics formed by knitting multiple fibers with air interposed between the fibers. The fiber fabric 81 has a base fabric portion 810, and the fiber fabric 82 has a mesh portion 821. Although the base fabric portion 810 and the mesh portion 821 are schematically shown in FIG. 3, the knitted fabric is actually configured as a three-dimensionally cubic knitted fabric. As shown in FIG. 4A, the fiber fabrics 81 and 82 are at least partially mesh-shaped. The mesh has a lattice shape. In other words, the fiber fabrics 81 and 82 have uneven shapes formed on the surfaces of the fiber fabrics 81 and 82.

The base fabric portion 810 is in the form of a thin sheet. The mesh portion 821 has a knitted structure in which yarn members are knitted to increase the density. The fiber fabrics 81 and 82 according to the present embodiment are formed inexpensively by integrally knitting two knitted fabrics. The fiber fabrics 81 and 82 have a double mesh structure in which two knitted fabrics are put on and knitted with each other.

Figure 4B:
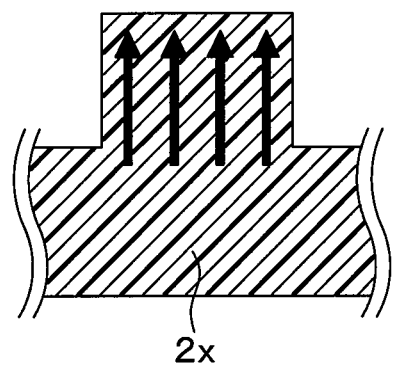
FIG. 4B is a schematic diagram showing a way of heat transfer in a comparative example.
Figure 4C:
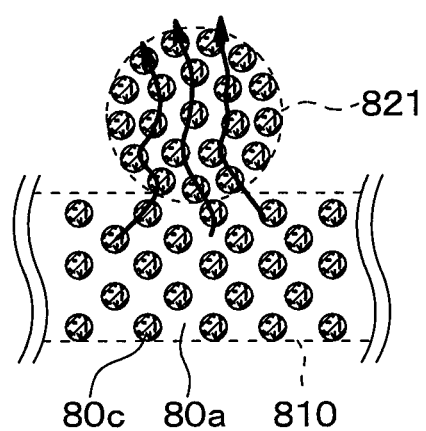
FIG. 4C is a schematic diagram showing a way of heat transfer according to the first embodiment.

The fiber fabrics 81 and 82 can be configured by chemical fibers such as PET (that is, polyethylene terephthalate), PA (that is, nylon), PPS (that is, polyphenylene sulfide), and natural fibers such as silk. The present inventors have found that the thermal conductivity of the knitted fabric according to the present disclosure using those chemical fibers and natural fibers such as silk is remarkably small as compared with the thermal conductivity of the thermoplastic resin configuring the substrate portion 2, as will be described below. FIG. 4B shows a schematic cross-sectional view of a knitted fabric according to the comparative example, and FIG. 4C shows a schematic cross-sectional view of the fiber fabrics 81 and 82 according to the present disclosure. As shown in FIGS. 4B and 4C, the way of heat transfer is different between the comparative example and the present disclosure. In the comparative example, as shown in FIG. 4B, the resin material of the substrate portion 2X is formed in a sheet shape or an uneven shape with a substantially uniform density. As shown by arrows, the heat conduction is uniformly performed through the resin disposed with a substantially uniform density. On the other hand, as shown in FIG. 4C, in the base fabric portion 810 and the mesh portion 821 in the present disclosure, multiple fibers are knitted with each other, and are formed in a cross section of the fibers with air interposed between the fibers. As a result, as shown by the arrows, a heat is transferred mainly through fiber portions 80c rather than through air portions 80a between the plurality of fibers. Therefore, a path through which the heat is transferred is smaller than that of the uniform resin material of the comparative example, and the heat conduction is remarkably reduced.

Assuming that a contact area when the object comes in contact with the surface member 80 is A, the thermal conductivity of the surface member 80 is λ, and a distance by which the heat transfers is L, the thermal resistance R when the object comes in contact with the surface member 80 is expressed by the following Expression 1.

$$R = L/\lambda \cdot A \qquad \text{(Expression 1)}$$

When a thickness of the surface member 80 is reduced by providing the space portion 80a recessed in the thickness direction, the distance L over which heat transfers is restricted, and therefore the thermal resistance R is reduced. Therefore, the heat in the thickness direction of the portion that comes in contact with the object is easily transferred. However, in the radiant heater device 1, the heat generation portions 5 has a structure in which the heat transfer in the surface direction of the substrate portion 2 is restricted. Further, in the radiant heater device 1, a contact area A with the object is restricted by the space portion 80a of the surface member 80, and therefore the thermal resistance R is increased, as compared with the case where the space portion 80a is not provided in the surface member 80. Therefore, according to the heater structure of the heat generation portions 5 and the structure of the surface member 80 in the radiant heater device 1, even if the temperature of the contact portion is high, the heat transfer occurs quickly from the heat generation portions 5 in the thickness direction of the surface member 80 at the moment of contact, and thereafter, the heat transfer in the planar direction of the heater and the surface member 80 is restricted. Therefore, the temperature of the contact portion can be quickly lowered. Also, the thermal discomfort to the occupant can be reduced.

A sum total thickness of the base fabric portion 810 and the mesh portion 821 is preferably set to 1 mm or less. In order to reduce the thermal resistance R, the sum total thickness of the base fabric portion 810 and the mesh portion 821 is preferably set to about 0.6 to 0.8 mm. A distance between the mesh portions 821 facing each other across the space portion 80a is preferably set to about 1 mm to 3 mm. The thickness of the mesh portion 821 is preferably set to about 0.3 mm.

In the verification by the present inventors, a surface temperature of protrusion portions of the surface member 80 is set to about 105° C., a temperature of the heat generation portions 5 at that time is set to 125 to 130° C., and a calculated value of the surface temperature of recess portions of the surface member 80 is set to 115° C. At that time, in the radiant heater device 1, the surface temperature of the protrusion portions of the surface member 80 at the moment when the object comes in contact with the surface member 80 is about 41 to 42° C., which is reduced by about 1° C. compared to other flat knitted fabrics having the same thickness, and the effect of reducing the temperature by about 3° C. can be confirmed as compared with the case where the knitted fabric is subjected to raising or flocking. In addition, since the temperature of the recess portions can be increased, it can be confirmed by evaluation that the emissivity is increased by about 30% as compared with other flat knitted fabrics having the same thickness.

According to the configuration described above, the surface member 80 is configured by the fiber fabrics 81 and 82 in which the space portion 80*a* recessed toward the substrate portion 2 in the thickness direction of the surface member 80 is provided and the space portion 80*a* restricts the heat transfer in the surface direction of the surface member 80. Therefore, the temperature of the contact portion when the object comes into contact with the contact portion can be lowered more quickly.

In addition, since the heat generation portions 5 are structured to restrict the transfer of heat in the surface direction of the substrate portion, the temperature of the contact portion when an object comes into contact with the contact portion can be more quickly lowered.

Figure 5:
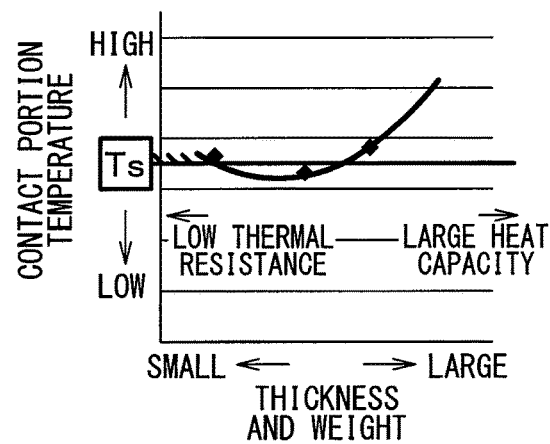
FIG. 5 is a diagram showing a relationship between a unit weight (for example, a thickness and a weight) of a surface member and a contact temperature of a contact portion.

FIG. 5 shows the evaluation result of the contact temperature of the finger to the radiant heater device 1 according to the difference in the unit weight (for example, the thickness and the weight) of the surface member 80. A horizontal axis represents the thickness and weight of the surface member 80, and a vertical axis represents a temperature of the contact portion. Assuming that the temperature at which pain due to general heat is felt (that is, 43° C.) is Ts, if the temperature of the surface member 80 is lower than the temperature Ts, it can be determined that the lower temperature is safe even if the finger or the like comes into contact with the surface member 80. In the flat knitted fabric in which the space portion 80*a* is not provided, as the thickness is smaller, the thermal resistance in the thickness direction becomes smaller, so that the heat transfer to the finger becomes large and the contact temperature becomes slightly high. Further, as the thickness is larger, the heat capacity of the surface member is greater, and therefore the heat transfer from around the contact portion becomes larger and the contact temperature becomes higher. From the above result, it has been found that the temperature of the contact portion tends to be convex downward with respect to the thickness and weight of the surface member 80. The optimum value is 0.6 to 0.8 mm in thickness.

Figure 6:
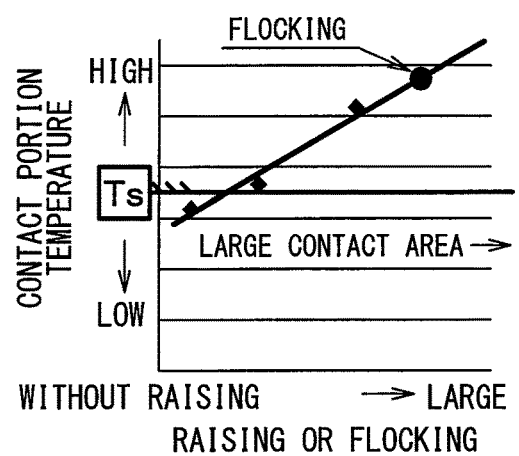
FIG. 6 is a graph showing a relationship of a contact temperature of the contact portion when a knitted fabric is raised or flocked.

FIG. 6 shows the evaluation result of the contact temperature of the finger with the radiant heater device 1 when the knitted fabric is raised or flocked. It has been found that when the knitted fabrics are raised or flocked, the temperature of the contact portion at the time of contact tends to rise more than when the knitted fabrics are not raised or flocked. In addition, it has been found that the degree of temperature rise of the contact portion at the time of contact tends to increase as a proportion of raised fabric is increased. Further, even when short fibers are transplanted on the heater surface with the use of an adhesive, a further increase in temperature can be confirmed. it can be estimated that this is because the contact area of the surface member with the finger increases and the thermal resistance decreases. In other words, it has been found that it is better not to subjecting the knitted fabrics to raising or flocking in order to lower the temperature of the contact portion.

Figure 7:
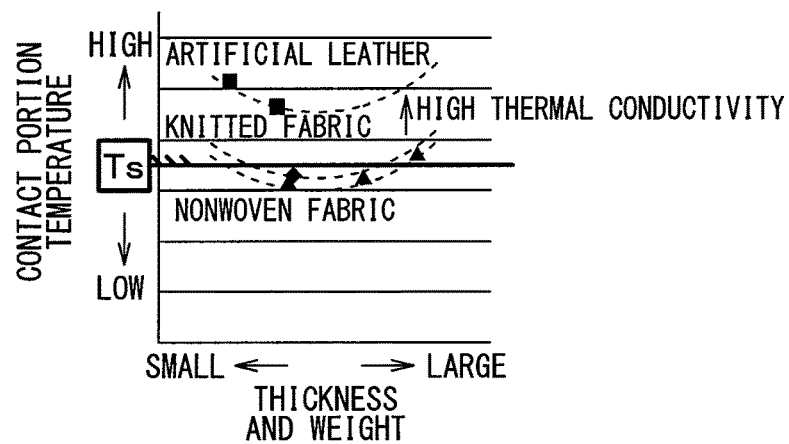
FIG. 7 is a graph showing characteristics of the contact temperature of the contact portion according to a difference in composition of the surface member.

FIG. 7 shows the evaluation result of the contact temperature of the finger to the radiant heater device 1 according to the difference in the composition of the surface member. In a joint skin (i.e., synthetic leather) whose surface is covered with acrylic or PVC (i.e., vinyl chloride) or the like, the thermal conductivity of the surface is increased, and thus the heat transfer is increased, so that the temperature of the contact portion at the time of contact is increased. It can be presumed that the nonwoven fabric made of only short fibers has a contact temperature equivalent to that of the knitted fabric, and small air chambers in the nonwoven fabric serve as heat insulation in the planar direction, thereby reducing the heat transfer.

Figure 8:
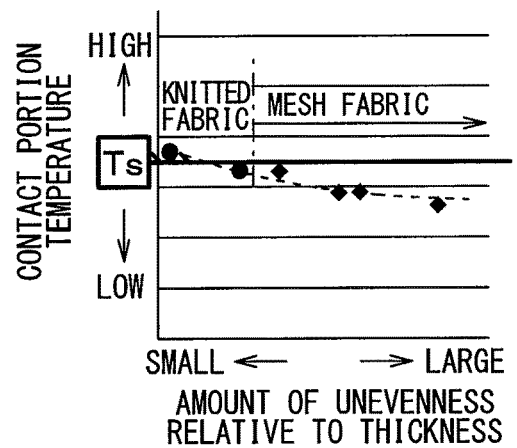
FIG. 8 is a graph showing characteristics of the contact temperature of the contact portion according to a difference in the amount of unevenness of the knitted fabric of the surface member.

FIG. 8 shows the evaluation result of the contact temperature of the finger to the radiant heater device 1 according to the difference in the amount of unevenness of the knitted fabric of the surface member. As with the above description, the typical thermal pain temperature (that is, 43° C.), is denoted by Ts, a temperature falling below the typical thermal pain temperature can be considered safe. It has been clearly found that as the unevenness due to the mesh is larger, the contact temperature of the contact portion is lower. When the unevenness is about 0.3 mm or lower, the temperature is reduced by the amount equal to that of the knitted fabric, but when the amount of unevenness exceeds 0.3 mm, the contact area at the time of contact is reduced and the contact temperature is greatly reduced. In the above evaluation, the above effect can be confirmed in a sample in which when the thickness of the protrusion portion is 0.9 to 1.0 mm, the difference in the recess and the protrusion is set to 0.5 to 0.7 mm.

Figure 9:
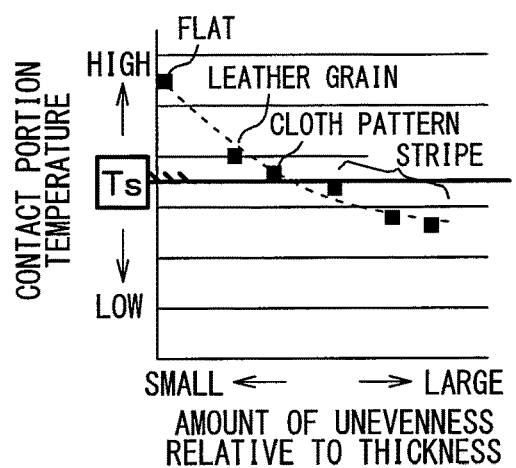
FIG. 9 is a graph showing a relationship between the amount of unevenness relative to a thickness and the contact temperature of the contact portion when a nonwoven fabric is used as the surface member.

FIG. 9 shows the evaluation result of the contact temperature to the finger of the radiant heater device 1 due to the difference in the amount of unevenness in the surface shape using the nonwoven fabric. In the flat portion in which the surface of the nonwoven fabric is made dense by press, the thermal conductivity becomes remarkably large, and the contact temperature increases extremely. In addition, even in the shape of a leather grain type or a fabric pattern having little unevenness, there is a tendency that the contact temperature lowers little. In that case, the amount of unevenness is about 0.1 to 0.2 mm. On the other hand, it can be confirmed that the contact temperature is lowered by increasing the amount of unevenness of the groove portion due to a stripe pattern, and, in that case, the advantage can be confirmed when the amount of unevenness is about 0.3 mm or more.

Figure 10:
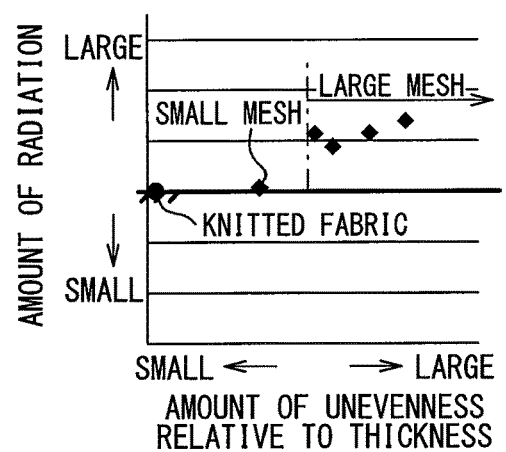
FIG. 10 is a graph showing characteristics of the contact temperature of the contact portion according to the difference in the amount of unevenness of the surface member.

FIG. 10 shows the evaluation result of the amount of radiation of the radiant heater device 1 according to the difference in the amount of unevenness of the surface member. In that evaluation, the amount of radiation at the surface temperature (for example, about 100° C.) is measured, and the magnitude of the amount of radiation is compared with that of a flat knitted fabric as a reference. According to the above result, it can be confirmed that when the unevenness of the mesh is small, the radiation amount is almost the same as that of the knitted fabric, but the radiation amount is increased more as the unevenness of the mesh is larger, and is increased by about 30%.

Second Embodiment

Figure 11:
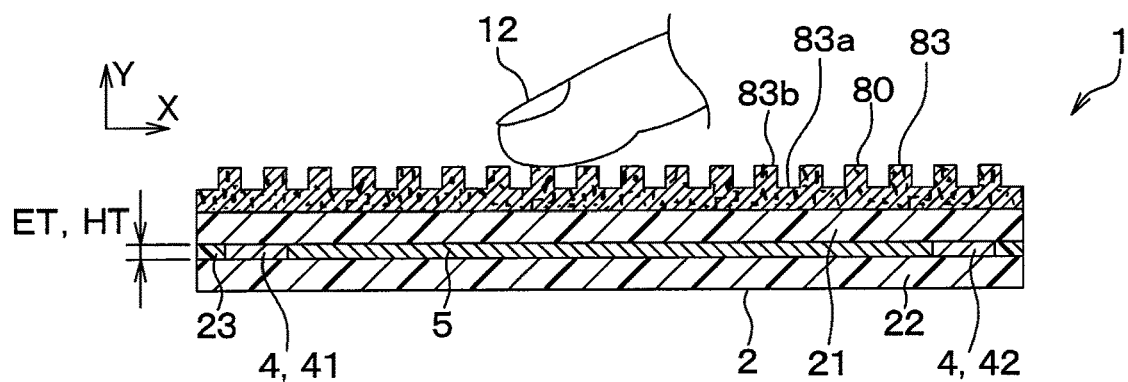
FIG. 11 is a cross-sectional view of a radiant heater device according to a second embodiment, which corresponds to FIG. 3.
Figure 12:
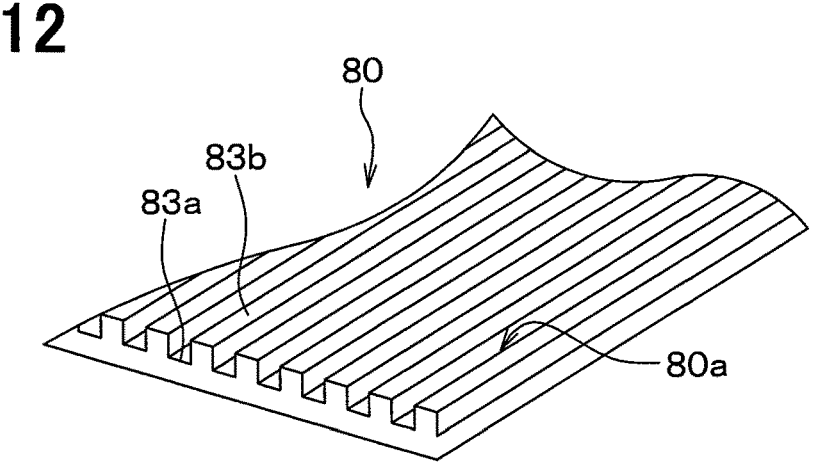
FIG. 12 is an external view of a nonwoven fabric according to the second embodiment.

A radiant heater device 1 according to a second embodiment of the present disclosure will be described with reference to FIGS. 11 to 12. The fiber fabrics 81 and 82 according to the first embodiment are composed of knitted fabrics, but a fiber fabric of the present embodiment is formed of a nonwoven fabric 83. A nonwoven fabric 83 is formed in a fabric shape in which multiple fibers are intertwined without being knitted, and a heat conduction is reduced by interposing air between the multiple fibers. Also in the present embodiment, the heat conduction is reduced in the same manner as shown in FIG. 4C. On a surface of the fiber fabric 83 according to the present embodiment, press portions 83a each serving as a linear recess portion and base fabric portions 83b each serving as a linear protrusion portion are alternately formed. The press portions 83a are recessed toward a front surface layer 21 side of the substrate portion 2. The press portions 83a and the base fabric portions 83b are formed by pressing the nonwoven fabric 83 with the use of a mold in which linear protrusion portions are provided. As described above, the press portions 83a and the base fabric portions 83b are inexpensively formed by press processing.

A thickness of the press portions 83a is thinner than that of the base fabric portions 83b. A density of fibers in the press portions 83a is higher than a density of fibers in the base fabric portions 83b. As a result, a thermal resistance of the press portions 83a in a thickness direction is smaller than that of the base fabric portions 83b.

In the present embodiment, the same advantages as those obtained from the configuration common to the first embodiment can be obtained in the same manner as in the first embodiment.

In verification by the present inventors, the surface temperature of the protrusion portion of the surface member 80 is set to about 105° C., the temperature of the heater heat generation portion at that time is set to 125 to 130° C., and a calculated value of the surface temperature of the recess portion of the surface member 80 is set to 115° C. At that time, in the radiant heater device 1 according to the present embodiment, the surface member temperature at the moment when the object comes in contact with the surface member 80 is about 42° C., and the effect of reducing the surface member temperature by about 2° C. as compared with other flat nonwoven fabrics having the same thickness, and the effect of reducing the temperature by about 3 to 4° C. as compared with fabrics subjected to a grain process in which the unevenness difference is as small as about 0.2 mm can be confirmed.

Third Embodiment

Figure 13:
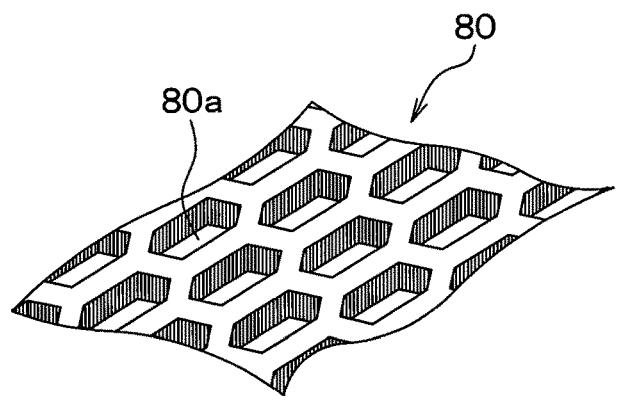
FIG. 13 is an external view of a surface member according to a third embodiment.

A radiant heater device 1 according to a third embodiment of the present disclosure will be described with reference to FIG. 13.

The fiber fabrics 81 and 82 according to the first embodiment have the mesh shape, but fiber fabrics 81 and 82 according to the present embodiment have a honeycomb shape. In this manner, the fiber fabrics 81 and 82 may have a honeycomb shape.

In the present embodiment, the same advantages as those obtained from the configuration common to the first embodiment can be obtained in the same manner as in the first embodiment.

OTHER EMBODIMENTS (1) In each of the embodiments described above, the multiple heat generation portions 5 are disposed in parallel with each other inside a substrate portion 2 having a lower thermal conductivity than the heat generation portions 5, and the heat generation portions 5 have a structure to restrict a heat transfer in a surface direction of the substrate portion 2. On the other hand, for example, the heat generation portions 5 may be formed to have a planar shape without a structure to restrict the heat transfer in the surface direction of the substrate portion 2.

(2) In the second embodiment, the press portions 83a having a linear shape are formed on the nonwoven fabric 83, but a shape other than a linear shape, such as a lattice shape or a honeycomb shape, may be used. Through holes penetrating both surfaces of the nonwoven fabric 83 may be provided in the nonwoven fabric 83, and a space defined by the through-holes may be the space portion 80a.

(3) The fiber fabric according to the first embodiment has the double mesh structure in which two fiber fabrics are put on each other, but may have a mesh structure in which one fiber fabric is subjected to mesh processing.

It should be noted that the present disclosure is not limited to the above-described embodiments, and can be change as appropriate. The embodiments described above are not independent of each other, and can be appropriately combined except when the combination is obviously impossible. In each of the embodiments described above, it is needless to say that the elements constituting the embodiment are not necessarily indispensable except when it is clearly indicated that they are particularly indispensable, when they are clearly considered to be indispensable in principle, and the like. Further, in each of the embodiments described above, when numerical values such as the number, numerical value, quantity, range, and the like of the constituent elements of the embodiment are referred to, except in the case where the numerical values are expressly indispensable in particular, the case where the numerical values are obviously limited to a specific number in principle, and the like, the present disclosure is not limited to the specific number. Further, in each of the embodiments described above, when referring to the material, shape, positional relationship, and the like of the components and the like, except in the case where the components are specifically specified, and in the case where the components are fundamentally limited to a specific material, shape, positional relationship, and the like, the components are not limited to the material, shape, positional relationship, and the like.

CONCLUSION

According to a first aspect shown in part or all of the embodiments described above, the radiant heater device for generating a radiant heat includes a plate-shaped substrate portion made of an electrically insulating material, a sheet-shaped surface member disposed on one surface side of the substrate portion, and a heat generation portion formed on the other surface side of the substrate portion. The surface member is formed of a fiber fabric in which the space portion recessed toward the substrate portion in the thickness direction of the surface member is provided and the heat transfer in the surface direction of the surface member is restricted by the space portion.

According to a second aspect, the fiber fabric is configured by interposing air between multiple fibers. According to a third aspect, the heat generation portion has a structure in which the heat transfer in the surface direction of the substrate portion is reduced. Therefore, the temperature of the contact portion when the object comes into contact with the contact portion can be quickly lowered.

According to a fourth aspect, the fiber fabric has the mesh shape. In this manner, the fiber fabric can have the mesh shape.

According to a fifth aspect, the fiber fabric has the double mesh structure in which two knitted fabrics are put on each other. Therefore, the thickness can be made larger than that in the case of using the single fiber fabric, and the surface member having the optimum thickness can be formed.

According to a sixth aspect, the mesh shape is the lattice shape. In this manner, the mesh shape can be the lattice shape.

According to a seventh aspect, the mesh shape is the honeycomb shape. In this manner, the mesh shape may be the honeycomb shape.

According to an eighth aspect, the fiber fabric is formed of the knitted fabric. Therefore, a sense of luxury can be also provided.

According to a ninth aspect, the fiber fabric is formed of the nonwoven fabric. Therefore, a cushioning action can be exerted when the object such as the finger comes into contact with the surface member.

The invention claimed is:

1. A radiant heater device for generating a radiant heat, comprising:
   a substrate portion having a plate shape and made of an electrically insulating material;
   a surface member having a sheet shape and disposed on one surface side of the substrate portion; and
   a heat generation portion formed on the other surface side of the substrate portion, wherein
   the surface member is formed of a fiber fabric that is provided with a space portion recessed toward the substrate portion in a thickness direction of the surface member,
   the fiber fabric is in contact with the substrate portion,
   the fiber fabric has a mesh shape, and
   the fiber fabric has a double mesh structure in which two knitted fabrics are superposed on each other.

2. The radiant heater device according to claim 1, wherein the fiber fabric is formed of a nonwoven fabric.

3. The radiant heater device according to claim 1, wherein the mesh shape is a lattice shape.

4. The radiant heater device according to claim 1, wherein the mesh shape is a honeycomb shape.

5. The radiant heater device according to claim 1, wherein the fiber fabric is formed by interposing air between a plurality of fibers.

6. A radiant heater device for generating a radiant heat, comprising:
   a substrate portion having a plate shape and made of an electrically insulating material;
   a surface member having a sheet shape and disposed on one surface side of the substrate portion; and
   a heat generation portion formed on the other surface side of the substrate portion, wherein
   the surface member is formed of a fiber fabric that is provided with a space portion recessed toward the substrate portion in a thickness direction of the surface member,
   the fiber fabric is in contact with the substrate portion, and
   the heat generation portion has a structure to restrict a heat transfer in a surface direction of the substrate portion.

7. A radiant heater device for generating a radiant heat, comprising:
   a substrate portion having a plate shape and made of an electrically insulating material;
   a surface member having a sheet shape and disposed on one surface side of the substrate portion; and
   a heat generation portion formed on the other surface side of the substrate portion, wherein
   the surface member is formed of a fiber fabric that is provided with a space portion recessed toward the substrate portion in a thickness direction of the surface member,
   the fiber fabric has a mesh shape, and
   the fiber fabric has a double mesh structure in which two knitted fabrics are superposed on each other.

* * * * *